Dec. 7, 1965  G. HIRS  3,221,885
FILTER APPARATUS
Filed Jan. 9, 1962  3 Sheets-Sheet 1
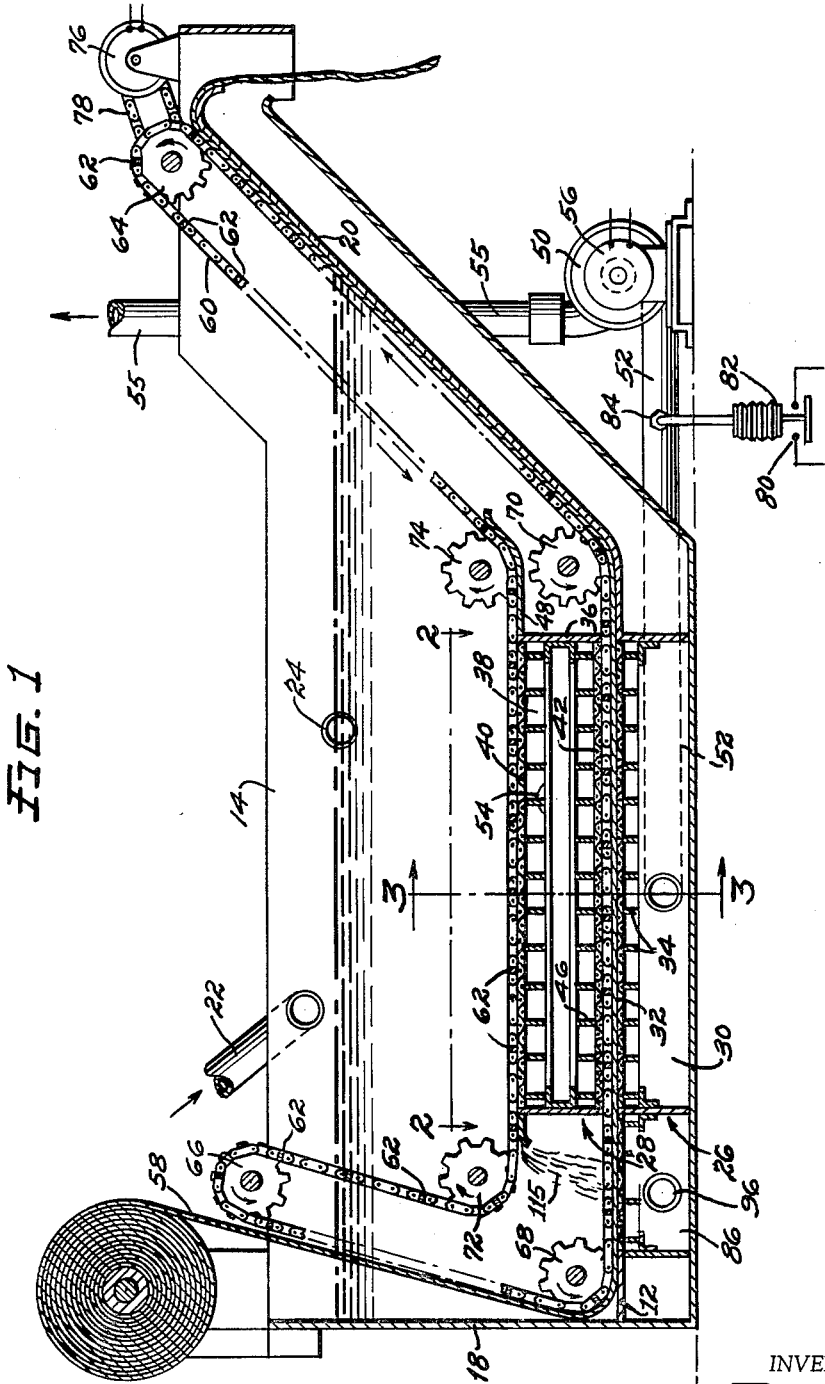
INVENTOR.
GENE HIRS.
BY Wallace P. Lamb
ATTORNEY.

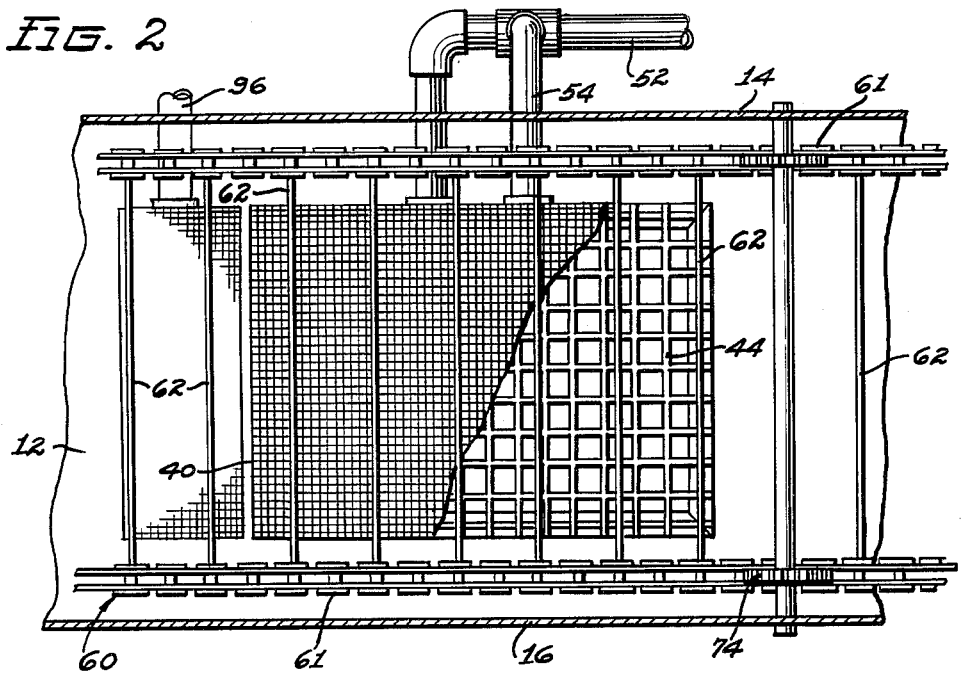
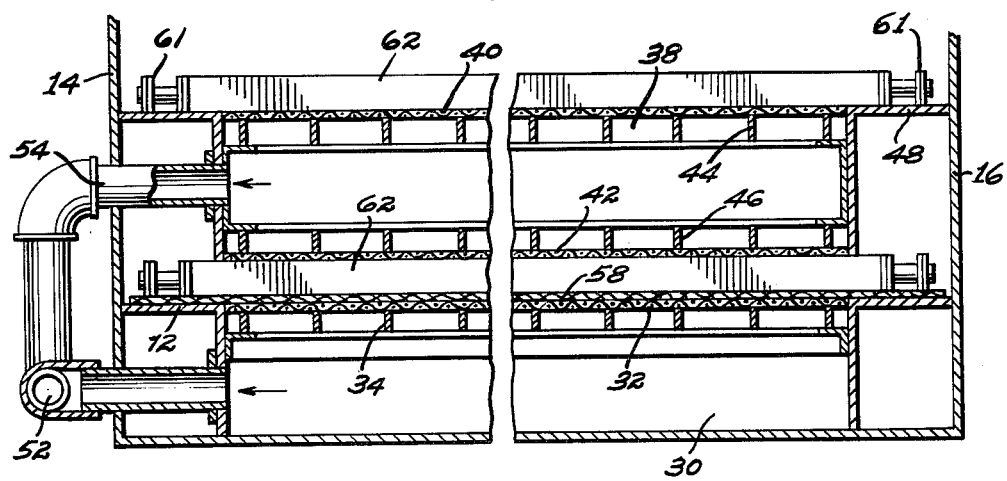
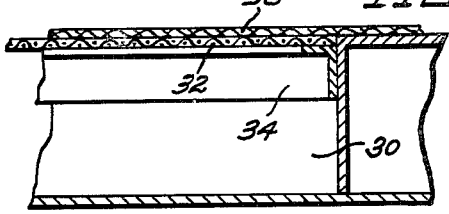

Dec. 7, 1965          G. HIRS          3,221,885

FILTER APPARATUS

Filed Jan. 9, 1962          3 Sheets-Sheet 3

INVENTOR.
GENE HIRS.
BY
Wallace P. Laud
ATTORNEY.

United States Patent Office 3,221,885
Patented Dec. 7, 1965

3,221,885
FILTER APPARATUS
Gene Hirs, 17208 Greenview Road, Detroit, Mich.
Filed Jan. 9, 1962, Ser. No. 165,187
5 Claims. (Cl. 210—298)

This invention relates generally to filter apparatus and particularly to liquid filter apparatus.

It is an object of the present invention to provide an improved liquid filtering apparatus for removing contaminants in the form of solids from the liquid.

Another object of the invention is to provide a filter apparatus of the above-mentioned character having improved filtering efficiency.

A further object of the invention is to provide a liquid filter having vertically spaced filter sections arranged in cooperative relationship with an endless scraper belt adapted to remove contaminants from all of the filter sections.

More specifically, it is an object of the invention to provide in a filter apparatus having submerged upper and lower filter units, for transfer of the contaminants from the upper unit to a contaminant removing filter web passing between the upper and lower units.

Other objects of the invention will become apparent from the following detail description taken in connection with the accompanying drawings in which:

FIG. 1 is a vertical sectional view of a filter embodying features of my invention;

FIG. 2 is a fragmentary horizontal sectional view, taken along the line 2—2 of FIG. 1;

FIG. 3 is a vertical cross sectional view, taken along the line 3—3 of FIG. 1;

FIG. 4 is a fragmentary sectional view of a detail of construction;

Figure 5:
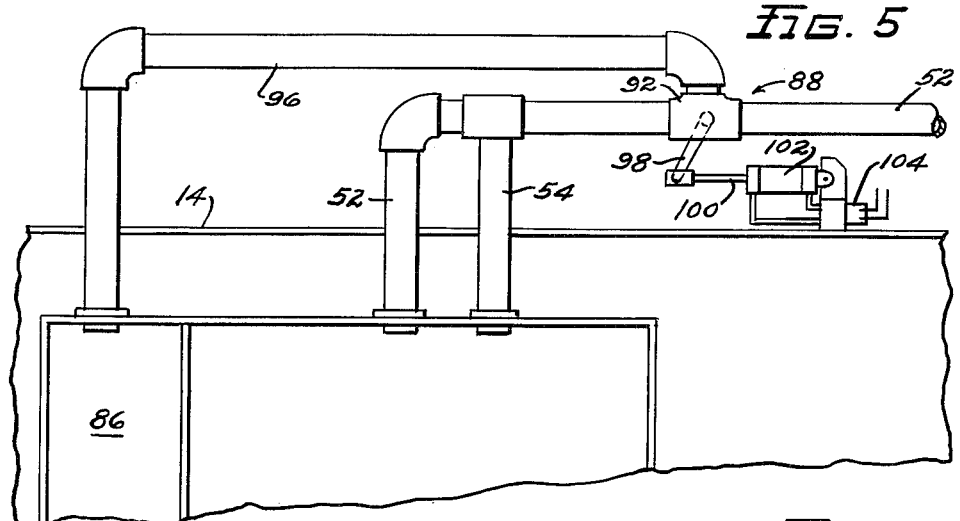
FIG. 5 is a fragmentary plan view.

Referring to the drawings by characters of reference, the filter includes a tank 10 for receiving contaminated liquid, the tank having a bottom wall 12, side walls 14 and 16, and end walls 18 and 20. The tank end wall 20 is inclined upwardly and outwardly from the bottom wall 12, providing a ramp up which contaminants are removed from the tank by mechanism hereinafter described. Contaminated liquid to be filtered may be conducted to the tank 10 by a supply pipe 22 and the liquid level within the tank may be maintained substantially constant by an overflow stand pipe 24, or by any other suitable means, such as the well known float operated valve mechanism.

In order to efficiently remove solids from the liquid in tank 10, I provide a lower filter unit 26 and an upper filter unit 28, the lower unit being at the tank bottom wall 12 and the upper unit being spaced directly vertically above the lower unit. The lower filter unit 26 includes a box-like structure providing a liquid outlet chamber 30 below the tank wall 12, the outlet chamber having a rectangular intake opening in the bottom wall 12 which is covered by a metal supporting screen 32. The screen 32 is flush with the upper surface of the bottom wall and is supported on and welded to a grate 34 which in turn is welded to the side walls of the chamber 30.

The upper filter unit 28, like the lower unit 26, has side walls 36 forming an outlet chamber 38, but differs from the lower chamber in that both the upper and lower ends are open for intake of liquid. These ends of the chamber 38 are respectively covered by filter media which may be fine metal screening 40 and 42. The filter screens 40 and 42 are preferably supported on grates 44 and 46 respectively and the screens and grates may be welded or be otherwise suitably secured to the side walls 36 of the outlet chamber. The upper filter unit 28 is suspended from the underside of a horizontal supporting wall 48 which is mounted rigidly on the tank side walls 14 and 16, as shown in FIG. 3.

A pump 50 is provided to withdraw liquid from the tank 10 through the filter chambers 30 and 38, the pump having its intake connected by a pipe 52 to chamber 30 and by a branch pipe 54 to the upper chamber 38. The discharge side of the pump 50 has a supply pipe 55 connected thereto for conducting the filtrate to a reservoir tank (not shown). An electric motor 56 drives the pump continuously when the filter apparatus is in operation, or where line switch 57 is closed.

A filter media in the form of a web 58 is fed and guided by a conveyor or belt 60 down into the liquid at the tank end wall 18, along the tank bottom wall 12 between the lower and upper filter units 26 and 28, and then up the ramp 20 and out of the tank. The filter web 58 may be a paper medium or other inexpensive disposable material. The conveyor belt 60 comprises a pair of laterally spaced apart endless chains 61 connected together by cross members or flights 62. These cross members have the dual function of (1) of engaging the web 58 to effect the feeding of the web on the outer side of the belt and (2) to scrape off and carry away the foreign matter or filtered-out solids from the opposed filter screens 32 and 42. The chains 61 respectively travel about like sets of sprockets, each set including a driven sprocket 64 at the discharge end of the belt and a guide sprocket 66 at the feed end of the belt. Intermediate the feed and discharge ends of the belt, each set of the sprockets includes a pair of lower horizontally spaced guide sprockets 68 and 70 which guide the lead side of the chains along the tank bottom wall 12, and an upper pair of like guide sprockets 72 and 74 which guide the trailing sides of the chains along the upper horizontal wall 48. The chains slide along the walls 12 and 48 outwardly of the liquid intakes of the outlet chambers 30, 38 as shown in FIGS. 2 and 3. An electric motor 76 may be employed to drive the conveyor chains, preferably by way of any well known, speed reduction mechanism and a chain connection 78 to the shaft of the driven sprockets 64.

A normally open pressure responsive switch 80 is electrically connected to control operation of the conveyor motor 76, the switch being diagrammatically illustrated as including a bellows 82. The bellows 82 is communicatively connected, as at 84, to the suction side of the pump 50 and thus is subject to the mean or average pressure of chambers 30 and 38. Variation in this pressure is indicative of the efficiency of the filtering rate and when the filter media becomes clogged with foreign matter such that a predetermined subatmospheric pressure is created on the suction side of the pump 50, the bellows 82 will close switch 80 to start the conveyor motor 76.

Figure 6:
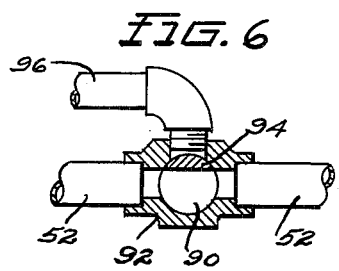
FIG. 6 is a detail view of a valve.

It will be apparent that as the foreign matter accumulates on the media overlying the intakes of the outlet chambers 30, 38, the filter rate decreases accordingly and that the pump 50 will eventually exhaust most of the liquid from the chambers which creates a differential pressure opposing movement of the media by the conveyor motor 76. In order to reduce the differential pressure such that the motor 76 can move the filter media without need of shutting off the pump 50 and without danger of tearing the media, I provide an auxiliary outlet chamber 86 and a two-way valve 88 by means of which the intake of the pump 50 may be disconnected from chambers 30, 38 and temporarily connected to the auxiliary chamber 86. As is shown more clearly in FIG. 6, the two-way valve 88 includes a rotatable valve member 90 in a valve body 92 which is connected in the pipe 52 between the pump 50 and the branch pipe 54, and normally the valve member 90, as shown in FIG. 6, is in position to establish communication between the outlet chambers 30, 38 and the intake of the pump 50 and to close a port 94 which is connected by a pipe 96 to the auxiliary chamber 86. A valve operating arm 98 is connected by a connecting rod 100 to the piston (not shown) of a hydraulic cylinder 102 having a conventional valve controlled by a normally inactivated solenoid 104. It will thus be apparent that when the solenoid 104 is energized, the valve member 90 is rotated through 90 degrees to change the connection of the pump 50 to the auxiliary chamber 86 whereupon the pressure in chambers 30, 38 increases with corresponding decrease in the differential of the pressures on the opposite sides of the filter media.

Figure 7:
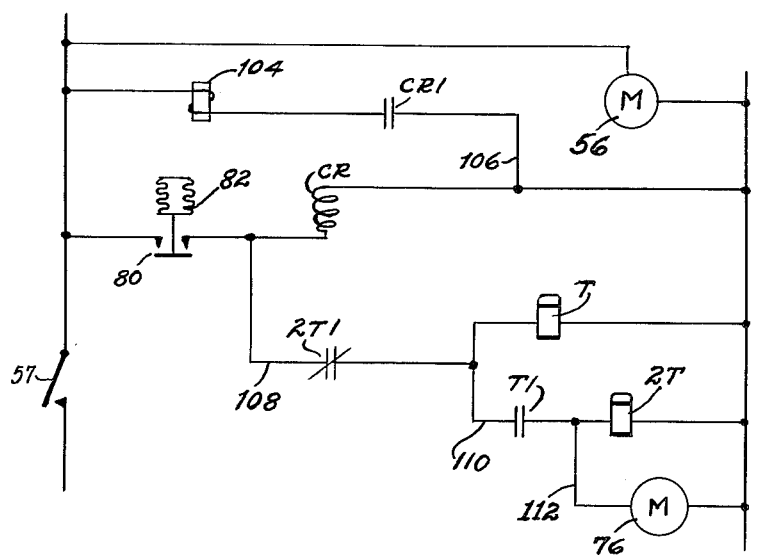
FIG. 7 is a diagrammatical illustration of a control system for the filter.

With particular reference to FIG. 7, it will be seen that the contacts of the pressure switch 80 are connected across the main power lines and are in series circuit with a relay coil CR of a holding circuit which hold solenoid 104 energized so that when the pressure switch 80 opens in response to the aforementioned increase in pressure on the intake of the pump 50, when the pump is connected to the auxiliary chamber 86, the solenoid 104 will remain energized. The relay CR has a pair of normally open holding contacts CR1 which are in series with the solenoid 104 and are connected, by a lead 106, in series with relay coil CR. A timer or delayed action relay T is also connected in series with the relay coil CR. A second timer or delayed action relay 2T is also connected in series with the holding relay coil CR and has a pair of normally closed contacts 2T1 in lead 108. The timer T has a pair of normally open contacts T1 in lead 110 and therefore in series with timer 2T and the conveyor motor 76 is connected by a lead 112 between contacts T1 and timer 2T. The timer T is of the type which, following its energization, will delay the closing of its contacts T1 and the delay, in this instance is established for an interval calculated to be sufficient to allow for a decrease in differential pressure on opposite sides of the filter media 58 to a pressure which will not appreciably oppose movement of the media by the conveyor motor 76. The timer 2T and the conveyor motor 76 are controlled by the timer T, the timer 2T on being energized, delaying the opening of its contacts 2T1 for an interval that determines the length of time of operation of the conveyor motor 76.

*Operation*

In operation, liquid in the tank 10 is caused to flow under the action of the suction pump 50 through the screen filters 40 and 42 into the upper chamber 38 and into the lower chamber 30 through the portion of the filter web 12 overlying the intake of the lower chamber, to the pump 50 whence the filtrate is delivered by pipe 55 to a point of use, or to a storage tank. As filtering continues, the contaminants or solids build up on the filter screens 40, 42 and on the filter web 58 overlying the intake of the lower chamber 30. When this build-up reaches the point where flow from the tank 10 into the chambers 30 and 38 is less than the capacity of the pump 50, then the continuously operating pump reduces the pressures in the compartments and when the pressure on the intake side of the pump reaches a predetermined subatmospheric pressure, the pressure switch 80 closes in response thereto. When the pressure switch 80 closes, it causes relay CR to be energized which then closes its holding contacts CR1. The solenoid 104 is energized by the closing of the pressure switch 80 and is held energized by the holding circuit which includes relay CR and its holding contacts CR1. The energization of the solenoid 104 activates the hydraulic cylinder 102 to rotate the valve member 90 to the position where communication of chambers 30 and 38 with the intake of pump 50 is discontinued and connection is established between the pump intake and the auxiliary chamber 86. As this occurs, the timer T is energized, the circuit being from one side of the line through solenoid 104, the now closed contacts CR1, lead 106, relay coil CR, lead 108, closed timer contacts 2T1, and timer T to the other side of the line. After a set interval, calculated as the time required for a decrease in the differential pressure on opposite sides of the filter media to reach a substantially static condition, the timer T closes its contacts T1 which energizes the conveyor motor 76 and the motor timer 2T. After an interval, the timer 2T opens its contacts 2T1 which breaks the holding circuit to stop the conveyor motor 76 and the solenoid 104 which upon deenergization allows the valve member 90 to be returned to its normal position shown in FIG. 6, again establishing communication between the intake of pump 50 and the outlet chambers 30 and 38. The motor 76 drives the conveyor, and the scrapers 62 on the leading side of the conveyor moves the filter media web 58 to bring a fresh portion of the web over the intake of chamber 30 and at the same time scrapes the foreign matter from the lower and upper filter screens 42 and 40 of the upper filter element 28. This causes additional liquid flow from the chambers 30, 38 under the influence of pump 50. As above mentioned, when the conveyor moves, the scrapers 62 of the upper or trailing side thereof, scrape the foreign matter from the upper screen filter 40, the foreign matter, as at 115, dropping down onto the filter web 58. Thus, the foreign matter from the three filtering areas 40, 42 and 32 is ultimately carried by the web 58 up the ramp 20 and discharged externally of the tank 10.

*Résumé*

From the foregoing description, it will now be appreciated that I have provided an improved liquid filtering apparatus in which a filter web is carried down to the bottom of a liquid tank and moved along over the pump intake of a liquid outlet chamber in response to a clogged condition of the web by foreign matter and also in response to the clogged condition of a second liquid outlet chamber. One of the advantages of the present filter is that the operation of removing the foreign matter is dependent upon the mean reduction of pressure by the pump in the upper and lower outlet chambers. In addition it will be appreciated that I have provided a filter apparatus having stacked filter units and a drag conveyor arranged to traverse the several filtering areas of the stack units to remove foreign matter from the filter.

While I have shown and described my filter apparatus in considerable detail, it will be understood that many variations and changes may be made therein without departing from the spirit and scope of the invention.

I claim:

1. In a filter apparatus, a tank to which contaminated liquid is supplied, means for maintaining at a substantially constant level the liquid in said tank, said tank having a bottom wall and an upwardly and outwardly inclined end wall forming a ramp, wall means forming a first vacuum chamber below the bottom wall of said tank and having an inlet opening in the bottom wall of said tank, a movable filter web extending down into the liquid to and along said bottom wall over said inlet opening and up said ramp and out of said tank, wall means forming a second vacuum chamber in said tank below the liquid level, said second chamber overlying said first chamber in vertically spaced and stacked relation thereto, said second vacuum chamber having an upper inlet opening, a fixed filter element overlying said inlet opening of said second chamber, an endless conveyor having spaced apart cross flights, means for driving said conveyor in a closed loop circumscribing said second chamber, said conveyor having a lower reach superimposed on said web to hold the same against said tank bottom wall with the flights engaging said web to drag the latter and any contaminants thereon along the bottom wall and up said ramp from said tank, said conveyor having an upper reach contacting said stationary filter element, movement of said lower reach toward said ramp moving said upper reach away from the ramp to scrape foreign matter from said fixed element to fall gravitationally onto the web therebelow, a liquid pump having an intake connected to both of said vacuum chambers and an outlet for filtrate under pressure, and means for driving said pump to establish less-than-atmospheric pressure in said chambers.

2. In a filter apparatus including a tank having side, end and bottom walls and to which contaminated liquid is supplied, means for maintaining the liquid level in said tank substantially constant, a vacuum box located interiorly of said tank in spaced relation to the end and bottom walls thereof and secured to the side walls to project laterally across said tank, said vacuum box having an upper wall opening and a lower wall opening, a first perforate filter medium overlying said upper wall opening and a second and different perforate filter medium underlying said lower wall opening so that filtrate only enters the interior of said box, contaminants accreting on said media, an endless conveyor in the form of a loop circumscribing said box, said conveyor having parallel upper and lower reaches contacting said first and second media, respectively, said lower reach being interposed between said box and the tank bottom and the end reaches of said conveyor, respectively, being interposed between said box and the end walls of said tank, and a filtrate pump having its intake connected to said vacuum box.

3. In a filter apparatus, a tank to which contaminated liquid is supplied, means for maintaining at a substantially constant level the liquid in said tank, said tank having a bottom wall and an upwardly and outwardly inclined end wall forming a ramp, wall means forming a first vacuum chamber below the bottom wall of said tank and communicating with said tank through an inlet opening in the bottom wall of said tank, a movable filter web extending down into the liquid to and along said bottom wall over said inlet opening and up said ramp and out of said tank, wall means forming a second vacuum chamber in said tank below the liquid level, said second chamber overlying said first chamber in vertically stacked spaced relation thereto, said second vacuum chamber having upper and lower inlet openings, separate fixed filter elements overlying said upper and lower inlet openings of said second chamber, respectively, an endless conveyor having spaced apart cross flights, means for driving said conveyor in a closed loop circumscribing said second chamber, said conveyor having a lower reach superimposed on said web to hold the same against said tank bottom wall with the flights engaging said web to drag the latter and any contaminants thereon along the bottom wall and up said ramp from said tank, the cross flights of said lower conveyor reach contacting the lower fixed filter element to scrape contaminants therefrom, said conveyor having an upper reach contacting said upper fixed filter element, movement of said conveyor lower reach toward said ramp moving said conveyor upper reach away from the ramp to scrape foreign matter from said upper fixed element to fall gravitationally onto the web therebelow, the movement of said web thus conveying all of the contaminants up said ramp and from said tank, a liquid pump having an intake connected to both of said vacuum chambers and an outlet for discharging filtrate under pressure, and means for driving said pump to establish less-than-atmospheric pressure in said chambers.

4. In a filter apparatus for removing contaminant particles from a contaminated liquid, a tank structure including a bottom wall and side and end walls surrounding an interior tank space, stationary wall means interiorly of said space and secured to said side walls defining a vacuum chamber having an open top and a bottom spaced from the tank bottom wall, means for maintaining a substantially constant body of contaminated liquid over the open top of said vacuum chamber, said vacuum chamber thus being sealed from the atmosphere, a perforate fixed filter medium overlying the open top of said vacuum chamber to remove said particles from liquid flowing through said open top and into said chamber, such particles accreting on the upper surface of said medium, an endless conveyor in the form of a closed loop circumscribing said chamber and having a lower reach depending into said tank to be interposed between said chamber and said tank bottom wall and an upper reach overlying said chamber, said conveyor having transverse scraper flights overlying the upper surfaces of said medium, power means for advancing said conveyor in said loop to scrape from said medium particles accreted thereon and contacted by said flights, and a filtrate pump having its intake connected to said chamber to create a vacuum therein supplementing the static head of said contaminant liquid in said tank to induce the flow of liquid through said medium.

5. In a filter apparatus including a tank having side, end and bottom walls and to which contaminated liquid is supplied, means for maintaining the liquid level in said tank substantially constant, a vacuum box located interiorly of said tank in spaced relation to the walls thereof to project laterally across the tank, said vacuum box having openings in opposing walls thereof, a first perforate filter medium at one of said wall openings and a second and different perforate filter medium at the other of said wall openings so that filtrate only enters the interior of said box, contaminants accreting on said media, respectively, an endless conveyor in the form of a loop circumscribing said box, said conveyor having separate reaches paralleling said first and second media, respectively, and said conveyor reaches each having scraper flights contacting contaminants accreting on said media, means for advancing said conveyor in said loop so that said flights remove contaminants from both said media, and a filtrate pump having its intake connected to said vacuum box.

References Cited by the Examiner

UNITED STATES PATENTS

| | | | |
|---|---|---|---|
| 392,606 | 11/1888 | Heywood | 210—401 X |
| 794,631 | 7/1905 | Milne | 210—387 X |
| 1,403,369 | 1/1922 | Anderson | 210—400 X |
| 3,083,831 | 4/1963 | Fowler | 210—111 |

FOREIGN PATENTS 1,235,090   5/1960   France.

REUBEN FRIEDMAN, *Primary Examiner.*

HERBERT L. MARTIN, *Examiner.*